US006903835B1

United States Patent
Naoi

(10) Patent No.: US 6,903,835 B1
(45) Date of Patent: Jun. 7, 2005

(54) COMMUNICATION APPARATUS

(75) Inventor: Yuichi Naoi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,052

(22) Filed: Sep. 16, 1999

(30) Foreign Application Priority Data

Sep. 18, 1998 (JP) .......................................... 10-283338
Dec. 22, 1998 (JP) .......................................... 10-365202

(51) Int. Cl.⁷ .............................................. H04N 1/00
(52) U.S. Cl. ...................... 358/1.15; 358/434; 358/468; 379/100.01
(58) Field of Search ................................ 358/1.15, 442, 358/400, 468, 402, 434, 440; 379/100.01

(56) References Cited

U.S. PATENT DOCUMENTS

| | | | | |
|---|---|---|---|---|
| 4,554,413 A | * | 11/1985 | Pinede et al. ................ | 379/165 |
| 5,255,312 A | * | 10/1993 | Koshiishi ..................... | 379/100 |
| 5,317,629 A | * | 5/1994 | Watanabe .................. | 379/93.09 |
| 5,392,023 A | * | 2/1995 | D'Avello et al. ............ | 358/400 |
| 5,428,790 A | * | 6/1995 | Harper et al. ................ | 395/750 |
| 5,483,574 A | * | 1/1996 | Yuyama ..................... | 379/32.04 |
| 5,537,220 A | * | 7/1996 | Ezumi et al. ................ | 358/442 |
| 5,596,628 A | * | 1/1997 | Klein .......................... | 379/93 |
| 5,608,546 A | * | 3/1997 | Nakamura et al. .......... | 358/468 |
| 5,794,058 A | * | 8/1998 | Resnick ................. | 395/750.05 |
| 5,822,597 A | * | 10/1998 | Kawano et al. ........ | 395/750.05 |
| 5,909,488 A | * | 6/1999 | Koizumi et al. ........ | 379/376.02 |
| 5,930,346 A | * | 7/1999 | Chen ....................... | 379/211.02 |
| 5,974,559 A | * | 10/1999 | Bannai ........................ | 713/330 |
| 6,034,995 A | * | 3/2000 | Eisele et al. ................. | 375/257 |
| 6,089,456 A | * | 7/2000 | Walsh et al. ............. | 235/472.01 |
| 6,098,175 A | * | 8/2000 | Lee ............................. | 713/320 |
| 6,160,873 A | * | 12/2000 | Truong et al. .......... | 379/102.02 |

* cited by examiner

*Primary Examiner*—Joseph R. Pokrzywa
(74) *Attorney, Agent, or Firm*—Fitzpatrick, Cella, Harper & Scinto

(57) ABSTRACT

A low power dissipation facsimile apparatus is capable of accommodating a plurality of lines. This apparatus is arranged to reduce the power consumption still more. The apparatus comprises a first control unit having a low power dissipation mode, which controls a first line and the entire body of the facsimile apparatus, and a second control unit having a low power dissipation mode, wherein controls a second line and transfers communication data to the first control unit. Then, for the reception only on the first line, and also, for the transmission and the copying operation, the first control unit rises from the low power dissipation mode to execute operation accordingly. Also, for the reception only on the second line, only the second control unit rises from the low power dissipation mode to operate the reception, and at the same time, during reception or after the completion of reception, the first control unit rises from the low power dissipation mode to transfer the received data from the second control unit to the first control unit for printing out images.

18 Claims, 9 Drawing Sheets

COMMUNICATION APPARATUS

BACKGROUND OF THE INVENTION

1. Field of the Invention

The present invention relates to a multiple port communication apparatus capable of accommodating a plurality of lines. More particularly, the invention relates to a communication apparatus capable of reducing power dissipation as much as possible in the state other than the operational state of the apparatus (such as being engaged in transmission and reception, or in operation).

2. Related Background Art

As an example of the conventional communication apparatuses, a facsimile apparatus will be described.

In recent years, there has been developed a facsimile apparatus capable of accommodating a plurality of lines. In such a kind of facsimile apparatus, it is possible to make the facsimile transmission and reception through another line when one usual line is engaged. This type of apparatus is extremely useful in an office where the communication volume is great.

Also, in recent years, it has been required for a facsimile apparatus to provide a lower power dissipation. Particularly, in the overseas market, there is even a movement to enact regulations to control the power dissipation.

In the conventional facsimile apparatus, a system was always in the operational state. The resultant power dissipation was great.

In recent years, however, a facsimile apparatus is arranged to exercise the lower power dissipation. The apparatus is designed to enable the system to be at rest during the period other than the time when it is in transmission and reception or in operation.

Now, in accordance with the conventional art, the description will be made of the low power dissipation facsimile apparatus capable of accommodating only one line as given below.

This kind of facsimile apparatus is structured so as to supply a starting signal to a main power source at the time of facsimile transmission and reception or at the time of operation by an operator.

FIG. 4 is a block diagram which shows an example of such conventional facsimile apparatus as described above.

A main control unit 1a is arranged to control the facsimile apparatus as a whole. A line control unit 2a is to control the line connection.

An operation panel unit 3a comprise a key-board and others that an operator uses to operate the apparatus. A document sheet reading unit 5a contains an image sensor for reading images, and receives electric power form a power source 4a.

In this facsimile apparatus, a document sheet is read by the image sensor of the scanner 5a when the usual facsimile transmission is performed. Then, the image thus read is compressed by use of the main control unit 1a to send it out to a partner station through the line control unit 2a. The designation of this station is inputted through the operation panel unit 3a.

Also, for the usual facsimile reception, a call signal (CI signal) is detected from a line. Then, the line control unit 2a connects the line with an apparatus on the partner station to receive the image information transmitted therefrom.

The image thus received is expanded by the main control unit 1a to print it out by a printer control unit 9a on a recording sheet accordingly.

Then, the main control unit 1a controls whether or not the entire system should be in an operation condition or at rest. In this respect, a low power dissipation mode control unit 6a, which is provided for a part of the main control unit 1a, is kept active even when the system is at rest.

The low power dissipation mode control unit 6a monitors the off hooking of a hand set inputted from the line control unit 2a, a CI detection signal, a detection signal of the image sensor inputted from the scanner 5a, and a key input signals inputted from the operation panel unit 3a, respectively, as each of the factors that requires the actuation of the main power source.

Then, each of the circuits that monitors each factor that requires the actuation of the main power source is kept active even when the system is at rest.

The facsimile apparatus is in the low power dissipation mode as being on standby during the period other than the transmission and reception, or the operation. The low power dissipation mode control unit monitors the main power source actuation factors, and actuates the system when either one of the factors is detected.

When the usual operation is possible, the main control unit 1a monitors the main power actuation factors described above, and if any one of the factors is not detected for a predetermined period of time, this unit controls to enable the system itself at rest, and then, transfers the required control to the low power dissipation mode control unit 6a. Thus, the system is allowed to be at rest.

Here, FIG. 5 is a block diagram which shows a example of the conventional facsimile apparatus which is capable of accommodating a plurality of lines.

As shown in FIG. 5, control of a plurality of lines is made possible by installing another main control unit 1b and another line control unit 2b for connection.

As before-mentiones, a conventional facsimile apparatuse can reduce the power dissipation by causing the apparatus to be on standby.

However, the facsimile apparatus capable of accommondating a plurality of lines as described above has circuitry greater than that of such apparatus that deals with only one line, because it is necessary for the former to execute the control of plural lines.

Therefore, even if the control is transferred to the low power dissipation mode, the low power dissipation mode should be implemented with respect to the two main control units 1a and 1b. The resultant power consumption is increased inevitably even when the low power dissipation mode is performed, there is a possibility that the aforesaid power consumption regulation is not satisfied in some foreign countries.

Also, it may be conceivable to devise a method to improve the power source structure in order to serve the purpose. Technically, however, such improvement is extremely difficult.

SUMMARY OF THE INVENTION

With a view to solving the problems discussed above, the present invention is designed. It is an object of the invention to provide a multiple port communication apparatus capable of accommodating a plurality of lines, at the same time, reducing the power dissipation as much as possible when the apparatus is in the state other than the operational state (such as being engaged in transmission and reception or in operation).

In order to achieve the object described above, the communication apparatus of the present invention, which is capable of accommodating a plurality of lines, comprises a first communication unit connectable with a first communication line; a second communication unit connectable with a second communication line, being capable of reducing power dissipation on standby; and detection means for detecting an actuation factor for the second communication unit. For this communication apparatus, the first communication unit shifts the second communication unit from the standby state to the operating state in response to detection of the actuation factor of the second communication unit by the detection means.

Also, the communication apparatus of the present invention, which is capable of accommodating a plurality of lines, comprises a first communication unit connectable with a first communication line, being capable of reducing the power dissipation on standby; detection means for detecting an actuation factor for the first communication unit; output means for outputting data received by the first communication unit; a second communication unit connectable with a second communication line; and storage means for storing data received by the second communication unit. Then, when the first communication unit is on standby, the first communication unit shifts from the standby state to the operating state to receive data in response to detection of the actuation factor by the detection means, and outputs the received data to the output means, and on the other hand, when data is received by the second communication unit while the first communication unit is on standby, the second communication unit stores the received data in the storage means and enables the first communication unit to shift from the standby state to the operating state by sending an actuation signal from the second communication unit to the detection means, and the first communication unit outputs the data stored in the storage means to the output means.

Also, the communication apparatus of the present invention, which is capable of accommodating a plurality of lines, comprises a first communication unit connectable with a first communication line; a second communication unit connectable with a second communication line, being capable of reducing the power dissipation on standby; input means for inputting data; instruction means for instructing the transmission of the input data inputted by the input means; and control means for shifting the second communication unit from the standby state to the operating state in response to the instruction of the instruction means during the communication by the first communication unit, and transmitting data.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE INVENTION

As an example of a communication apparatus of the present invention, the description will be made of a facsimile apparatus.

First Embodiment

Figure 1:
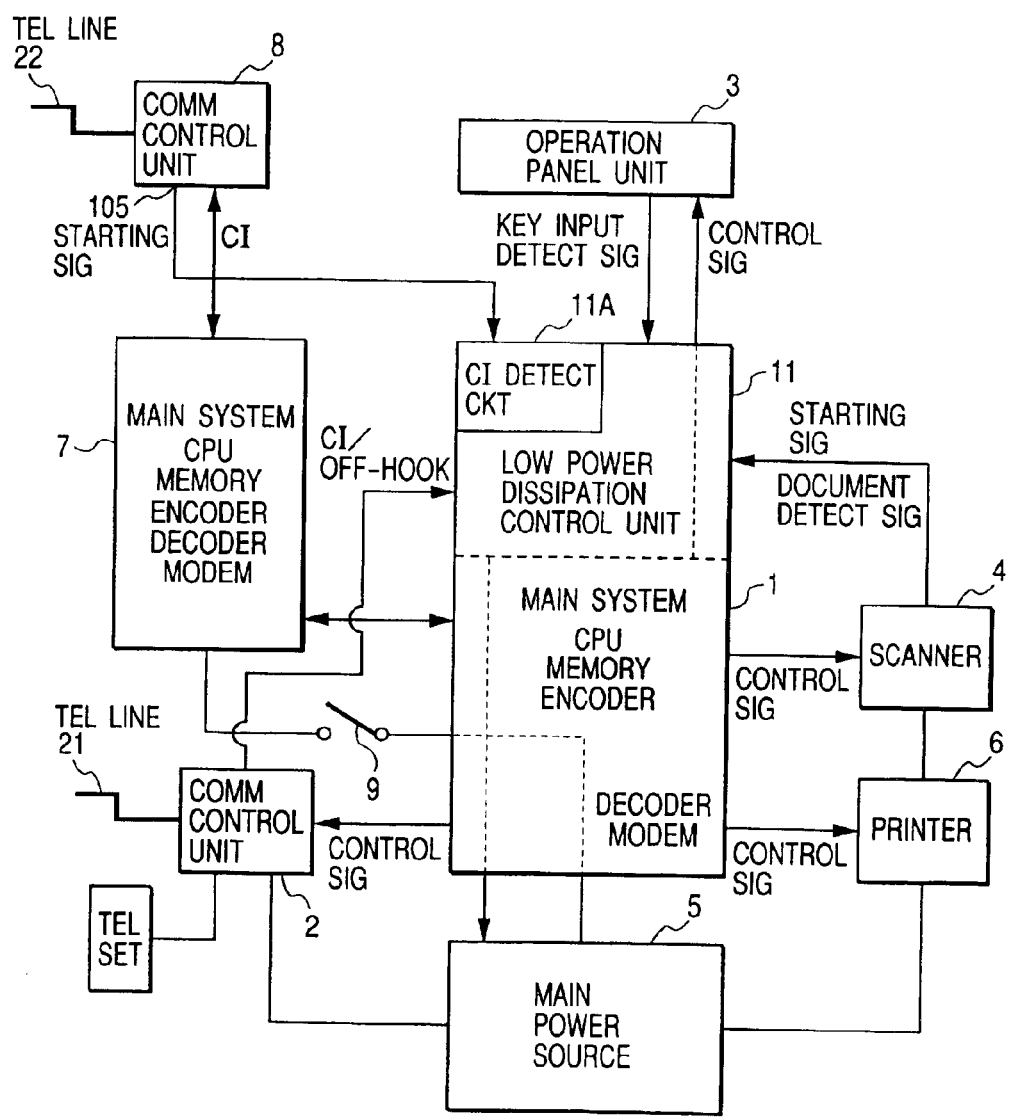
FIG. 1 is a block diagram which shows a facsimile apparatus in accordance with a first embodiment of the present invention.

FIG. 1 is a block diagram which shows a facsimile apparatus in accordance with a first embodiment of the present invention.

In accordance with the present embodiment, the facsimile apparatus comprises a first main control unit 1 that controls the apparatus as a whole; a first line control unit 2 that controls the connection with a first telephone line 21; an operation panel unit 3 that performs various operations, such as the input of a telephone number of an addressee; a scanner 4 that includes an image sensor for reading a document sheet; a printer 6 that prints out received images; and a main power source 5 that supplies power to the entire system.

Also, the facsimile apparatus of the present embodiment is of the two-line accommodative. This apparatus is, therefore, provided with a second line control unit 8 that controls a second telephone line 22 with the same function as that of the first line control unit 2, and also, provided with a second main control unit 7 that controls this line control unit.

The first main control unit 1 and the second main control unit 7 are connected through a specific interface so as to be able to exchange data. Also, for the first main control unit 1, there is arranged a low power dissipation control unit 11 to control whether or not power is supplied from the main power source 5 to the second main control unit 7.

A relay 9 is arranged between the power source lines for the main power source 5 and the second main control unit 7, which is controlled by the low power dissipation control unit 11.

Figure 2A:
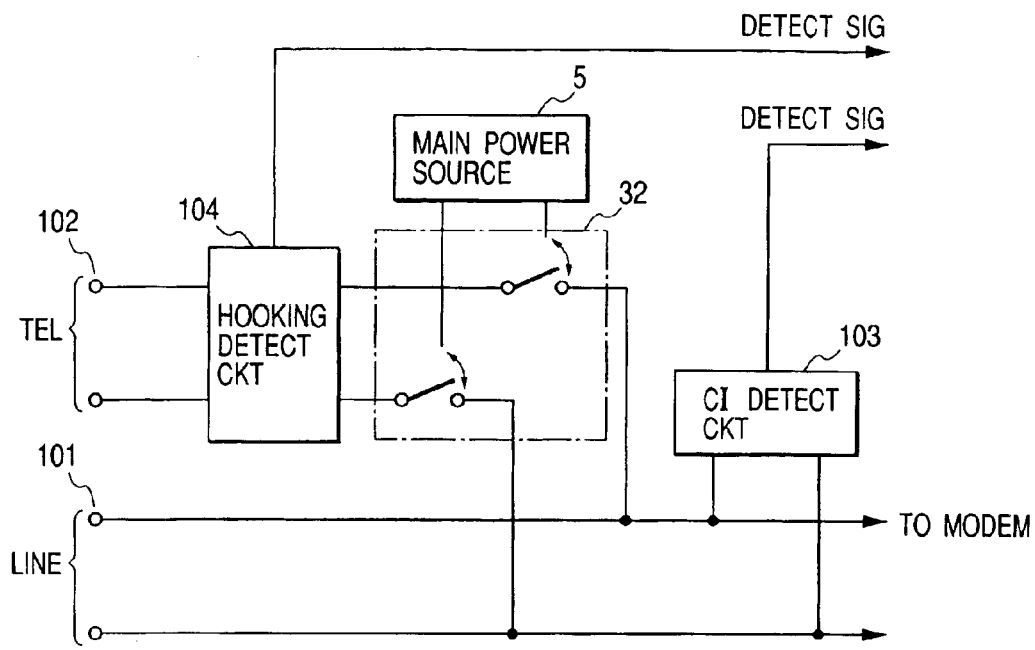
FIGS. 2A and 2B are block diagrams which illustrate the structure of a line control unit in accordance with the first embodiment of the present invention.

Now, FIG. 2A is a block diagram which shows the structure of the first line control unit 2.

As shown in FIG. 2A, the first line control unit 2 comprises a terminal 101 for the connection of the first telephone line (public line) 21, and in parallel therewith, a terminal 102 is arranged for an external telephone set 31. It is also provided with a CI detection circuit 103 that detects a CI signal (call signal) from the public line 21, and a hooking detection circuit 104 that detects the off hook of the external telephone set 31.

A detection signal of the CI detection circuit 103 becomes active when the call signal on the line 21 is detected. A detection signal of the hooking detection circuit 104 becomes active when a hand set of the external telephone set 31 is in the off hook condition. Then, these detection signals are inputted into the first main control unit 1 as main power supply activation factors.

Also, the first line control unit 2 disconnects the external telephone set 31 from the line temporarily on reception of a non-ringing facsimile signal. Therefore, a telephone set relay 32 is arranged between the external telephone set 31 and the public line 21. This relay 32 is connected with the power source 5 side when the power is not supplied to the first line control unit 2. Then, the structure is arranged so that the telephone set 31 is still usable even when the power supply is cut off for facsimile operation.

Figure 2B:
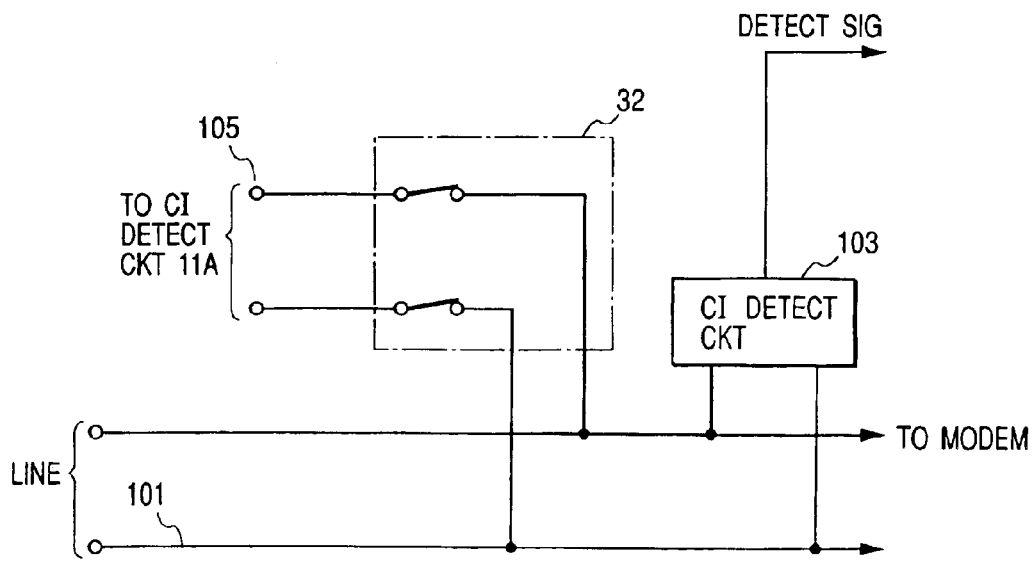

Now, FIG. 2B is a block diagram which shows the structure of the second line control unit 8. Here, the same reference marks are applied to the same structural elements of the first line control unit 2.

Although this second line control unit 8 is provided with the same function of the first line control unit 2 as described above, there is no connecting terminal 102 of the telephone set 31 arranged for the second line control unit 8.

In other words, the second line control unit 8 is provided with the telephone set relay 32 which is the means applied to connect the line and the telephone set in parallel as in the first line control unit 2, but this control unit is not provided with any terminal with which the telephone set is connected. Then, the telephone set relay 32 of the second line control unit 8 is always in the state of being separated from the power source 5 as shown in FIG. 2B, that is, this relay is controlled in the state where it is switched to the second telephone 22 side.

Also, a key input detection signal is output from the operation panel unit 3. When the key is depressed, the pay impact detection signal becomes active. The key input detection signal is then inputted into the first main control unit 1 as the main power activation factor.

Also, a detection signal of the document sheet sensor is output from the scanner unit 4, and when a document sheet is set on the scanner unit 4, the detection signal becomes active. Then, the detection signal of the document sheet sensor is inputted into the first main control unit 1 as the main power activation factor.

The CI detection signal from the first line control unit 2, the off-hook off detection signal, the key input detection signal, and the document sheet detection signal as described above are ORed (logical sum), and then, inputted into the first main control unit 1 as the main power source activation factor.

On the other hand, the CI detection signal is inputted from the second line control unit 8 to the second main control unit 7.

Also, a CI detection circuit 11A, which is the same as the one provided for the line control unit 2, is arranged for the first main control unit 1, with which is connected the connecting terminal 105 of the telephone set relay 31 of the second line control unit 8. Therefore, the CI detection circuit 11A of the first main control unit 1 is always connected with the second telephone line 22.

Now, the description will be made of the operation of the facsimile apparatus structured as described above.

At first, when the facsimile is transmitted using the first telephone line 21, an image read from the scanner 4 is binary coded, and converted by the first main control unit 1 into the MH, MR, or MMR code.

The data thus converted are converted into the analogue signals by use of the modem of the first main control unit 1, and output onto the first telephone line 21 connected with a called party the first line control unit 2.

Also, when the facsimile is received using the first telephone line 21, the reception signal (CI signal) from a calling party is detected by the CI detection circuit 103 of the first line control unit 2. Then, the line is connected with the calling party. The modem of the first main control unit 1 converts the analogue signals from the calling party into data. Further, since the data are coded, the first main control unit 1 decode them into the image data which are transferred to the printer 6, hence being output as images.

Also, when using the telephone set 31 which is connected with the first telephone line 21 in parallel, the non-ringing facsimile reception is usually operated. Therefore, the telephone set 31 is released from the line, and the hook detection circuit 104 of the telephone set 31 is driven by the power supply from the line control unit 2.

Then, when the telephone set 31 is off hooked, the line control unit 2 detects it from the hook detection circuit 104, and brings the telephone relay 32 to the line 21 side. Thus, the telephone speech is made possible.

On the other hand, when the facsimile is transmitted by use of the second telephone line 22, the image read in from the scanner 4 is binary coded. Then, the first main control unit 1 converts it into the MH, MR, or MMR code. The coded data are sent to the second main control unit 7 and converted into the analogue signals by the modem of the second main control unit 7. Then, the signals are output by the second line control unit 8 to the second telephone line 22 which is connected with the called party.

Also, when the facsimile is received by use of the second telephone line 22, the call signal (CI signal) from the calling party is detected by the CI detection circuit 103 of the second line control unit 8, hence connecting the line with the calling party.

Then, the modem of the second main control unit 7 converts the analogue signal from the calling party into the data which are transferred to the first main control unit 1 where the coded data are decoded by the first main control unit 1, thus being output by the printer 6 as the image data.

Now, when the facsimile apparatus is brought into the low power dissipation state, the first main control unit 1 suspends the power supply to the second main control unit 7 and the second line control unit 8 by use of the low power dissipation control unit 11. Then, the first main control unit 1 itself suspends the clock oscillation to shift it to a sleeping mode.

Here, the key input of the first main control unit 1, the document sheet sensor, and each of the CI signal detection circuit 103 and the off hook detection circuit 104 are still in the operational mode. Likewise, the CI signal detection circuit 11A is in the operational mode with the connected terminal 105 of the second line control unit 8 in the first main control unit 1.

Then, when the system rises from the low power dissipation state in accordance with each of the factors, such as the key input, the detection by the document sheet sensor, the call signal from the first telephone line 21, and the off-hook of the telephone set 31, the low power dissipation control unit 11 of the first main control unit 1 detects it, and performs the rising operation as required.

Also, when the system should rise from the low power dissipation state in accordance with the call signal from the second telephone line 22, it is possible to detect the call by use of the CI signal detection circuit 11A, because, although no power is supplied to the second line control circuit 8, the aforesaid connecting terminal 105 is connected with the second telephone line 22 through the telephone set relay 32, and then, the connecting terminal 105 is directly connected with the CI signal detection circuit 11A of the low power dissipation control unit 11.

Therefore, the low power dissipation control unit 11 of the first main control unit 1, which has detected the call signal of the second telephone line 22, supplies the power to the second main control unit 7 and the second line control unit as well.

Then, when the second main control unit 7 rises, the CI signal detection circuit 103 of the second main control unit 7 is actuated to perform the usual call signal reception operation thereafter.

The second facsimile control unit 7 and the line control unit 8 control only the second line. Then, the transmission data (the data read in from the scanner) are transferred from the first facsimile control unit 1 to the second facsimile control unit 7 in the coded form. The modem of the second facsimile control unit 7 modulates and outputs them to the line through the second line control unit 8.

On the contrary, the reception data are inputted from the second line control unit 8 to the modem of the second facsimile control unit 7 where the data are demodulated. Then, the data are transferred to the first facsimile control unit 1 as the coded reception data. The first facsimile control unit 1 decodes the data which are output by the printer 9 in the form of prints.

Second Embodiment

Now, the description will be made of a second embodiment in accordance with the present invention.

Figure 3:
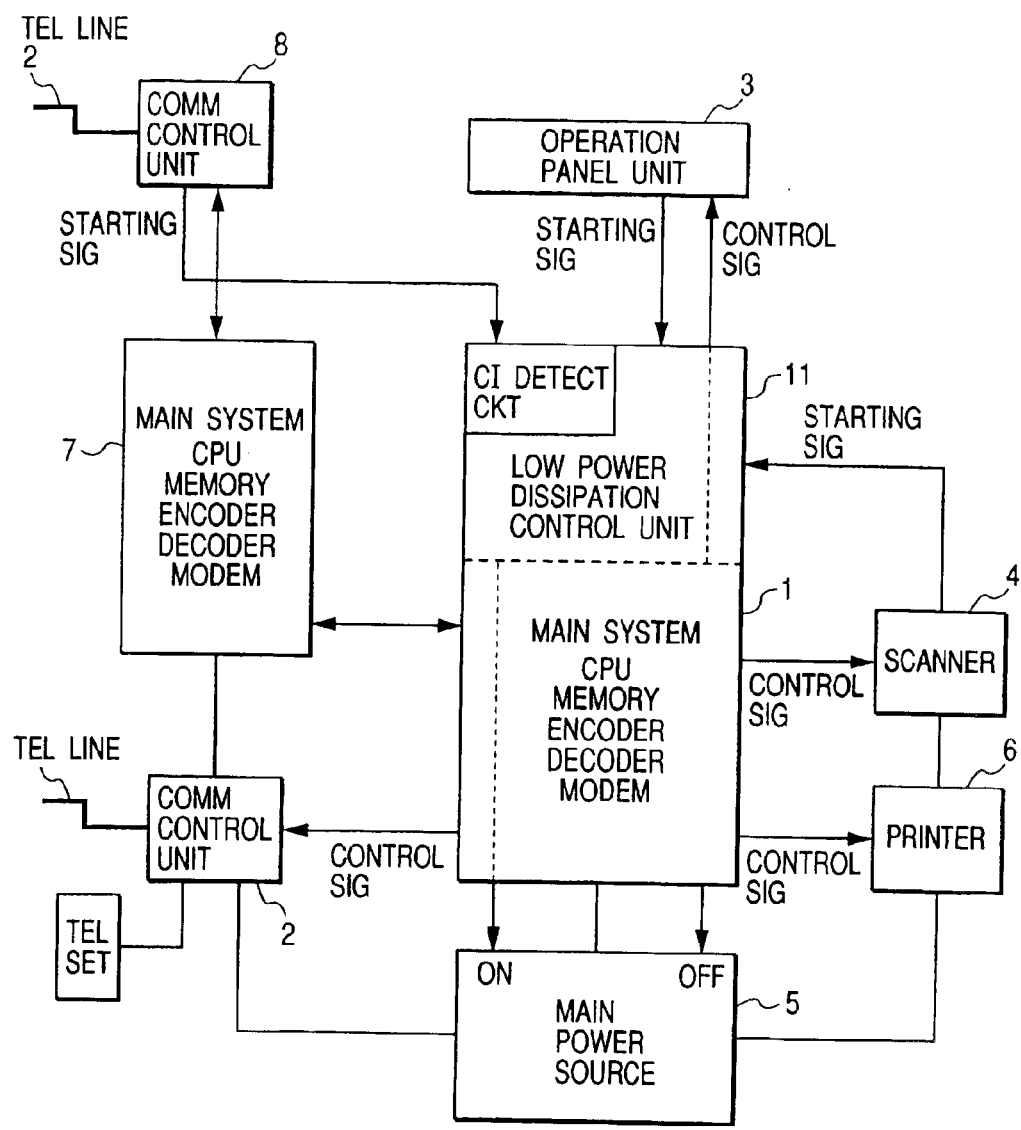
FIG. 3 is a block diagram which shows a facsimile apparatus in accordance with a second embodiment of the present invention.
Figure 4:
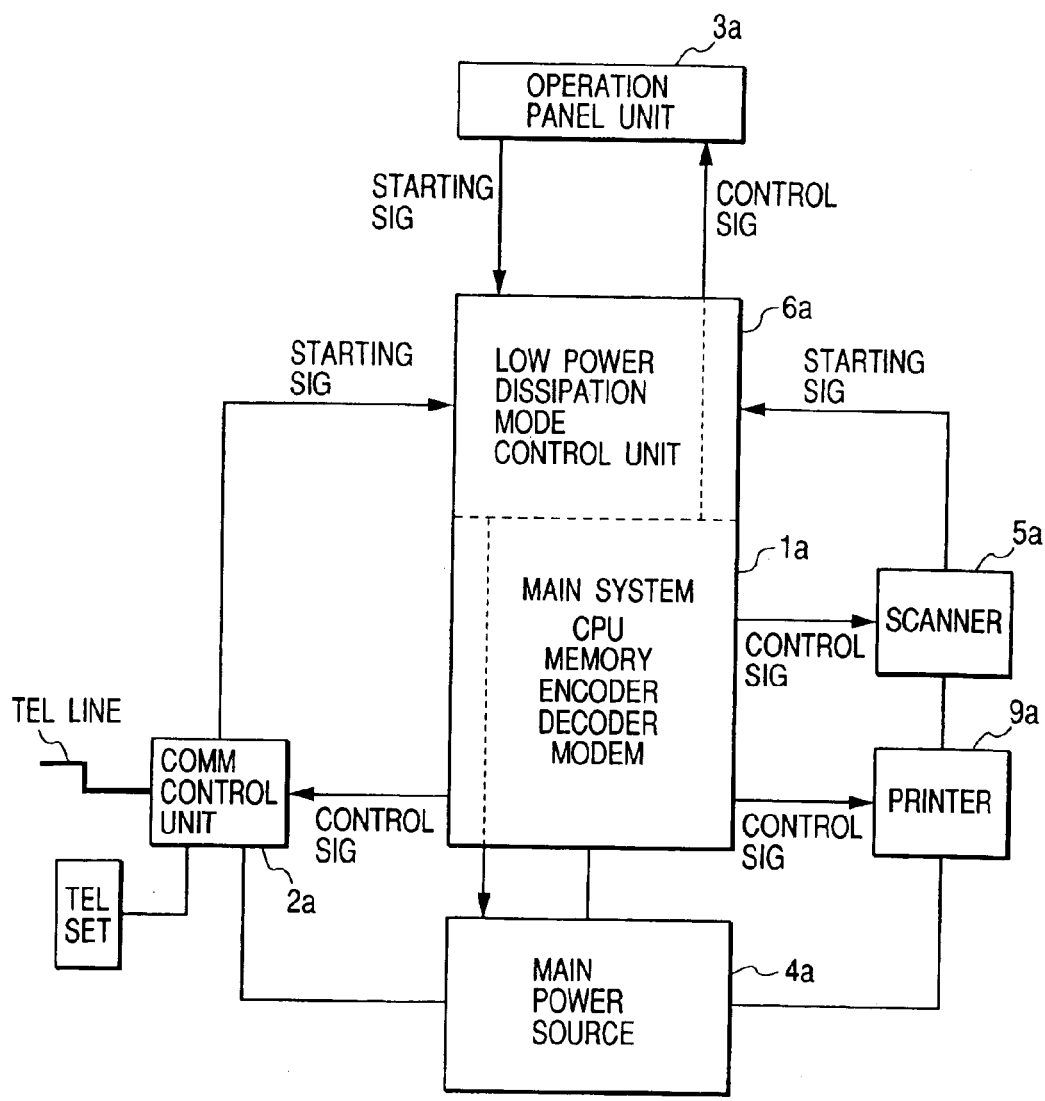
FIG. 4 is a block diagram which shows a structural example of the conventional facsimile apparatus.
Figure 5:
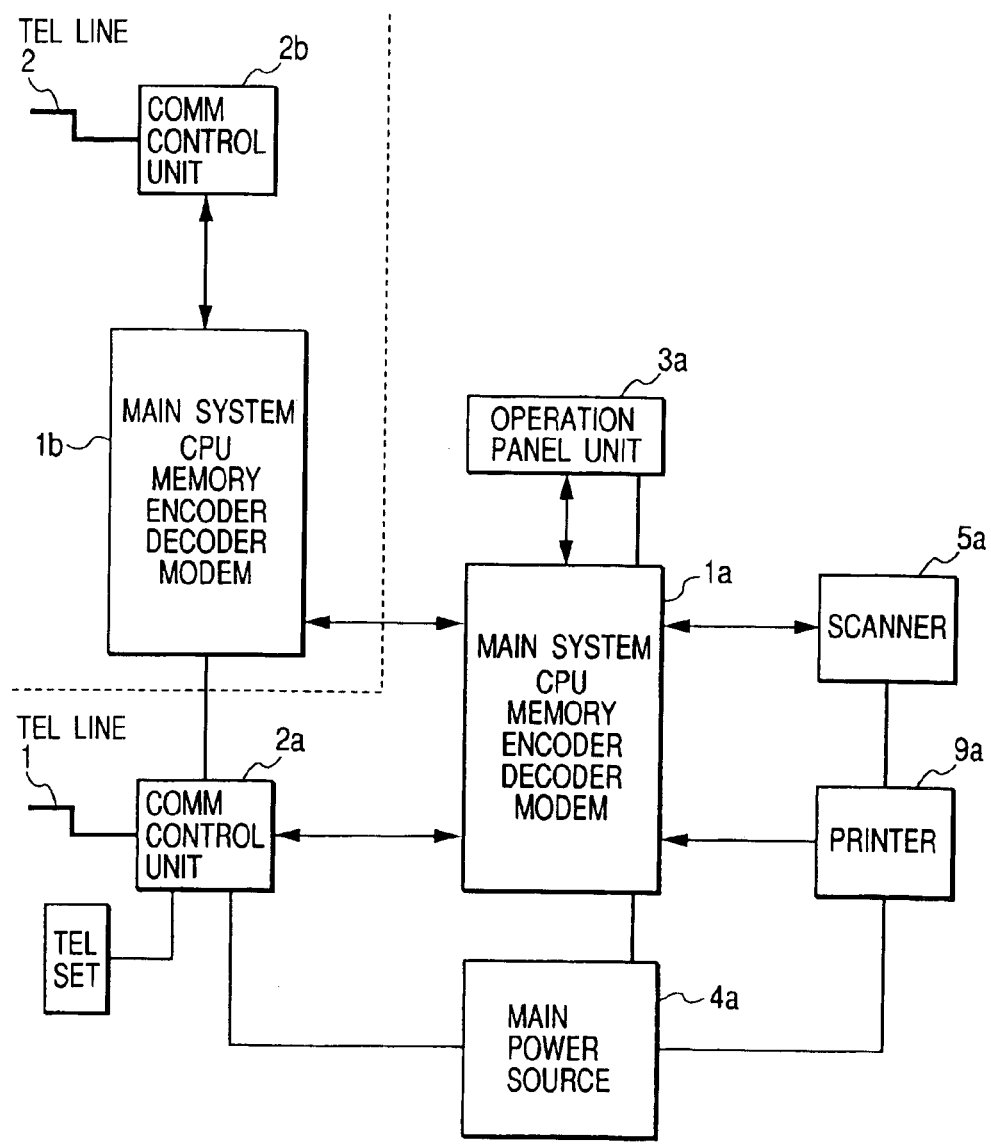
FIG. 5 is a block diagram which shows another structural example of the conventional facsimile apparatus.

FIG. 3 is a block diagram which shows the structure of a facsimile apparatus in accordance with a second embodiment of the present invention.

Figure 6:
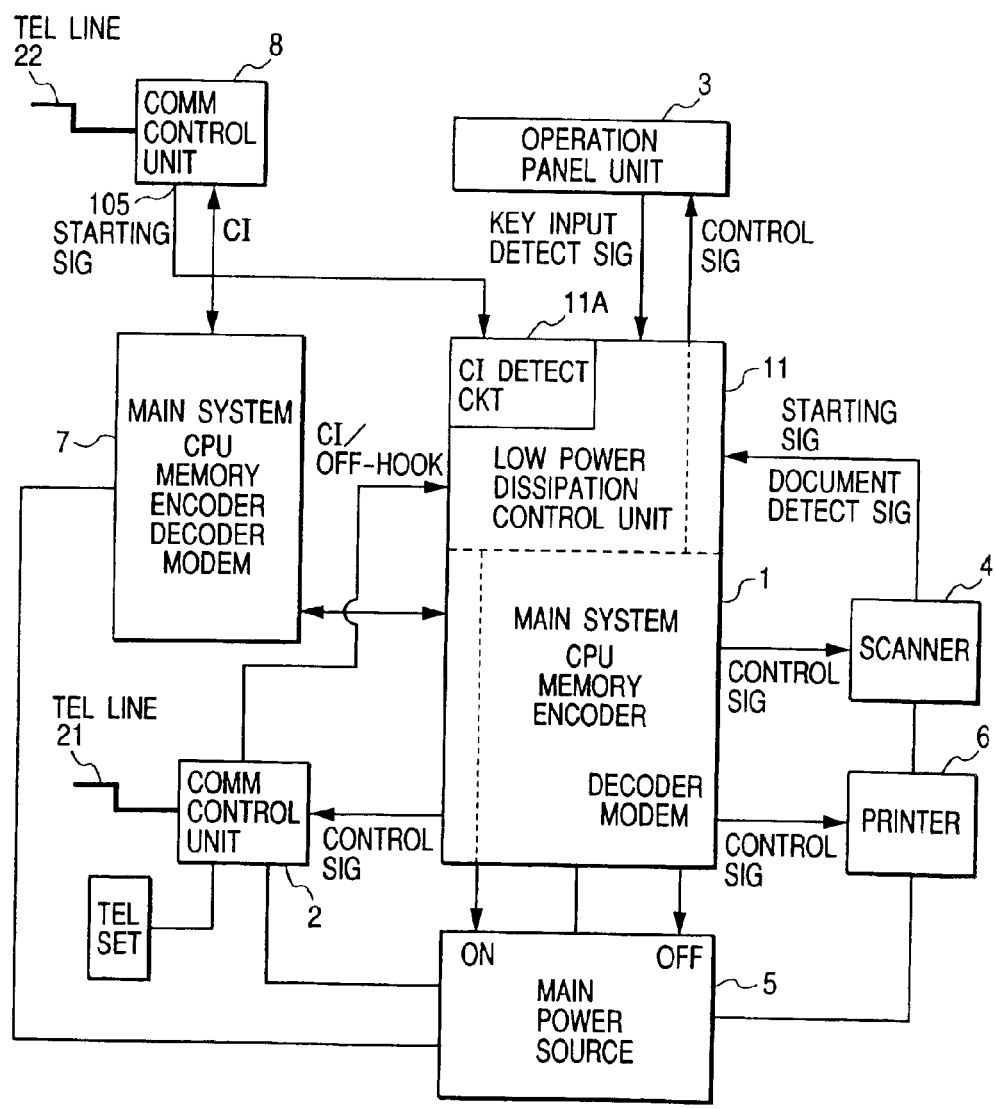
FIG. 6 is a block diagram which shows a facsimile apparatus in accordance with a second embodiment of the present invention.

For the first embodiment described above, the relay 9 of the power source line is controlled by the low power dissipation control unit 11 of the first main control unit 1. Then, the power supply to the second main control unit 7 and the line control unit 8 is controlled. For the second embodiment, however, the power source 5 itself is provided with a function to control the power supply to the second main control unit 7 and the line control unit 8. Then, this function is controlled by use of the low power dissipation control unit 11. FIG. 6 represents this state.

In this respect, the structure and operation of such function are identical to those described in conjunction with the first embodiment. The description thereof will be omitted.

Also, for the first embodiment, the description has been made of the telephone set relay 32 of the second line control unit 8 being always connected with the telephone line 22 side. However, it may be possible to execute the control so that the telephone set 32 is separated from the telephone line 22 in the state where the telephone set relay 32 is connected with the telephone line 22 side, and the power supply to the second line control unit 8 is turned on, while the power supply to the second line control unit 8 is turned off.

As described above, in accordance with the present invention, the monitoring control of the actuation factors in the low power dissipation mode of the second line control unit for the facsimile apparatus capable of accommodating a plurality of lines is not carried out by the second facsimile control unit that controls the second line control unit, but is made altogether by the first facsimile control unit that controls the first line control unit. As a result, the structure is made simpler, while producing the effect to suppress the power consumption at the time of the low per dissipation mode.

Third Embodiment

In accordance with a third embodiment of the present invention, the detailed description will be made of the relations between the operation of the first line control unit and that of the second line control unit.

Figure 7:
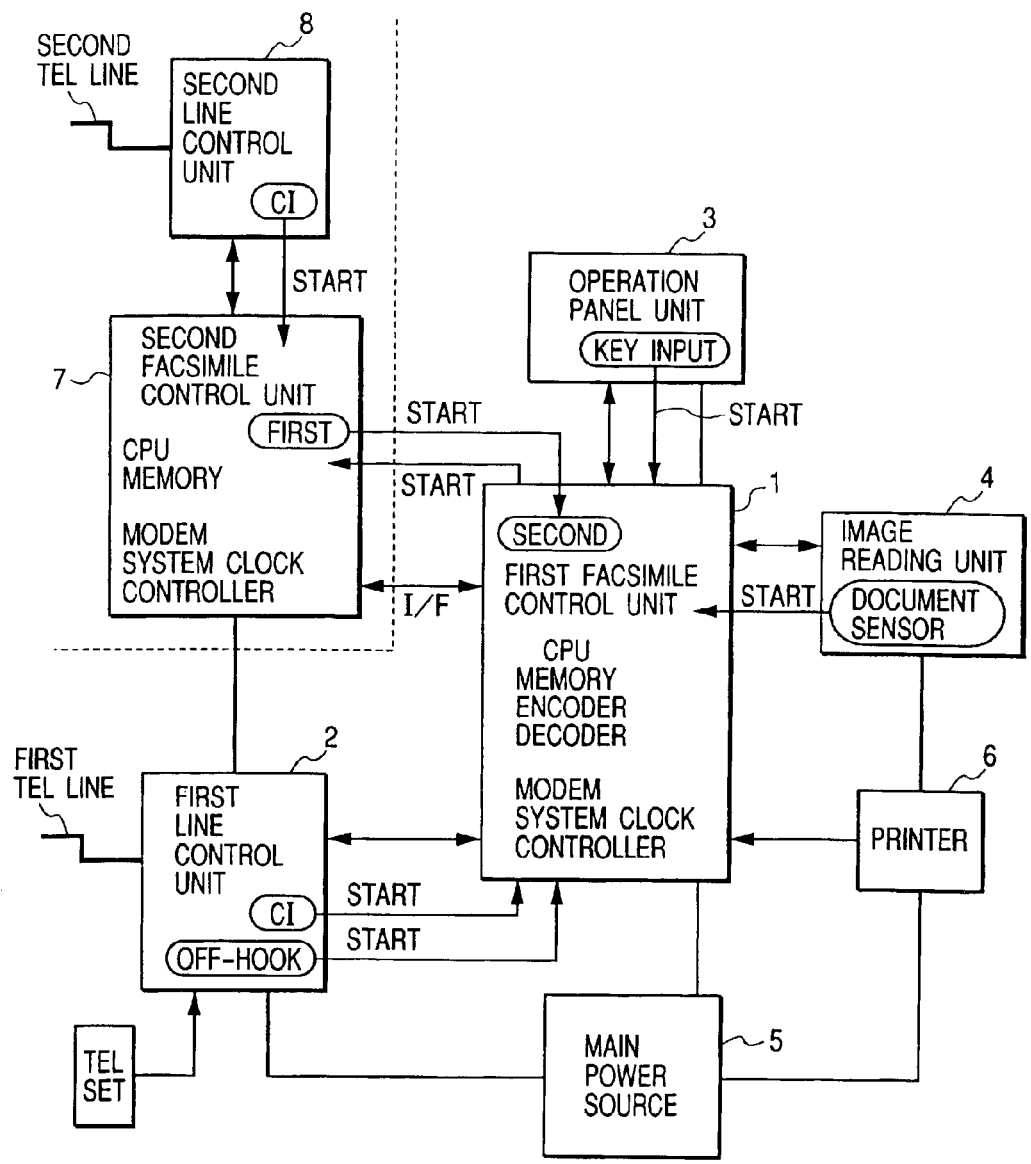
FIG. 7 is a block diagram which shows a low power dissipation facsimile apparatus capable of accommondating two lines in accordance with a third embodiment of the present invention.

FIG. 7 is a block diagram which shows the structure of the facsimile apparatus in accordance with the third embodiment of the present invention. In FIG. 7, the same reference marks are applied to the same parts as those appearing in FIG. 1. Then, the description thereof will be omitted.

In accordance with the present embodiment, clock control units are provided for the first facsimile control unit 1 and the second facsimile control unit 7, respectively, to make it possible to control the clock output supplied to each of the facsimile units 1 and 7 itself. With this clock control, it is arranged to operate the system to shift to the sleeping mode (the low power dissipation state).

A detection factor of the call signal is inputted from the second line control unit 8 to the second facsimile control unit 7, and at the same time, the actuation factors for the first facsimile control unit 2 are inputted from the second facsimile control unit 7 to the first facsimile control unit 1.

Also, the actuation factors for the second facsimile control unit 2 are inputted from the first facsimile control unit 1 to the second facsimile control unit 7.

The detection factor of the call signal from the first line control unit 2, the off hook factor of the telephone set, and each of the actuation factors of the key input, the document sheet sensor, and the second facsimile control unit are ORed (logical sum) and inputted to the first facsimile control unit 1 as the actuation factor.

Figure 8A:
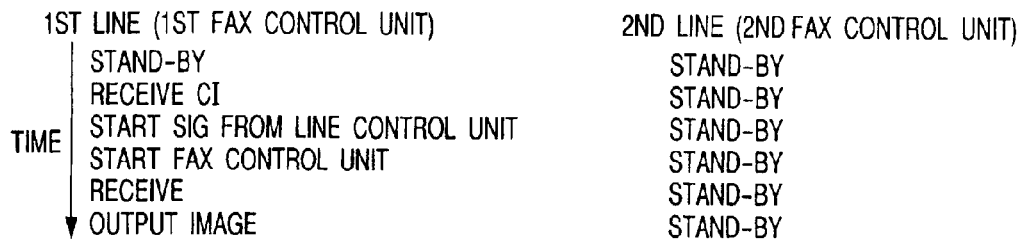
FIGS. 8A, 8B and 8C are views which illustrate a communication sequence between a first and second facsimile control units in accordance with the third embodiment of the present invention.
Figure 8B:
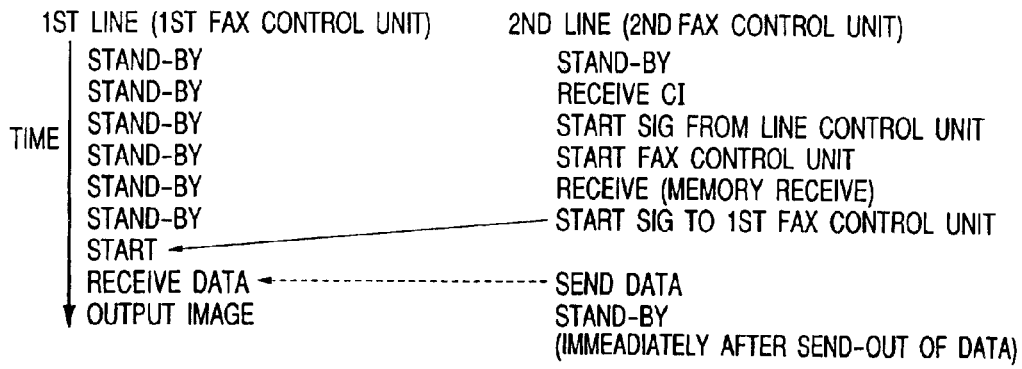
Figure 8C:
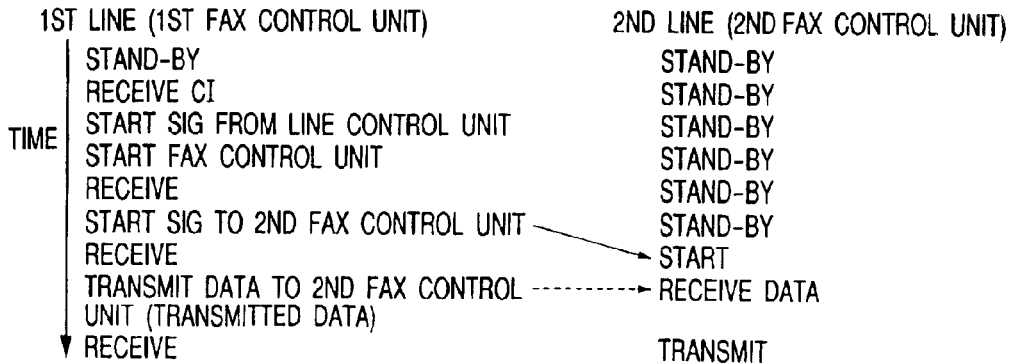

FIGS. 8A to 8C are views which illustrate a communication sequence between the first facsimile control unit 1 and the second facsimile control unit 7 in accordance with the present embodiment.

At first, when the facsimile is transmitted by use of the first line, the image read in from the scanner is binary coded, and converted by the first facsimile control unit 1 into the MH, MR, or MMR code.

The data thus converted is converted by the modem of the first facsimile control unit 1 into the analogue signal, and output to the public line from the first line control unit 2 which is connected with the called party.

Then, when the facsimile is received by use of the first line, the call signal (CI signal) from the calling party is detected by the CI detection circuit of the first line control unit 2 to connect the line with the calling party.

The modem of the first facsimile control unit 1 converts the analogue signal from the calling party into the data. Then, the coded data are decoded by the first facsimile control unit into the image data which are output by the printer unit 6 as images.

In the operation that uses the first line as described above, the second facsimile control unit 2 side is still on the standby (in the low power dissipation state) as shown in FIG. 8A, for example.

In contrast, when the facsimile is transmitted by use of the second line, the image read in from the scanner 4 is binary coded, and converted by the first facsimile control unit 1 into the MH, MR, or MMR code. The coded data is transferred to the second facsimile control unit 7, and converted by the second modem of the second facsimile control unit 7 into the analogue signal, which is output to the public line by the second line control unit 8 connected with the party to be called.

Then, when the facsimile is received by use of the second line, the call signal (CI signal) from the calling party is detected by the CI detection circuit of the second line control unit 8 as shown in FIG. 8B. Thus, the line is connected with the calling party.

Now, the modem of the second facsimile control unit 7 converts the analogue signal from the calling party into the data, which is transferred by the second facsimile control unit 7 to the first facsimile unit 1. The data thus coded are decoded by the first facsimile control unit 1 to become the image data to be output by the printer unit 6 as images.

Also, when the facsimile apparatus of the present embodiment enters the low power dissipation state, the first facsimile control unit 1 and the second facsimile control unit 7 suspends the clocks of the facsimile control units 1 and 8 by use of the clocking control units thereof, respectively. Hence, the system shifts to the sleeping mode.

In this case, there is in operational condition each of detection circuits for actuation factors, that is, the key input of the first facsimile control unit 1, the document sheet sensor, the CI signal from the first line control unit 2, the off hook of the telephone set, and the actuation signal from the second facsimile control unit 7. Also, the call signal detection circuit of the line control unit 8 in the second facsimile control unit 7, as well as each of detection circuits of the actuation signals from the first facsimile control unit 1 is likewise in operational condition.

Then, when the system rises from the low power dissipation state due to each of the factors, that is, the call signal from the first line and the off hook of the telephone set, the first facsimile control unit 1 detects it to execute the rising operation.

In this case, unless the operator designates the second line for the transmission operation, the clocks are not supplied to the second facsimile control unit 7 and the second line control unit 8. As a result, the second facsimile system is still in the sleeping mode.

Now, if the operator should designate the second line for the transmission operation or if he/she wishes to operate such transmission during communication through the first line, the actuation signal is sent out from the first facsimile control unit 1 to the second facsimile control unit 7 as shown in FIG. 8C. In this manner, the second facsimile control unit 7 rises from the sleeping mode.

Also, when the system rises from the low dissipation state due to the call signal from the second line, the detection thereof is made by the second line control unit 8. This detection is sensed by the second facsimile control unit 7 for the self rising operation as shown in FIG. 8B. Thus, the usual reception operation is performed.

In this case, unless the operator designates the first line for the transmission operation or unless the call signal arrives at the first line, the clocks are not supplied to the first facsimile control unit 1 and the first line control unit 2. Therefore, the first facsimile system is still in the state of the sleeping mode.

The received image data are stored on the memory of the second facsimile control unit 7 as the coded data.

Then, after the reception, the second facsimile control unit 7 activates the actuation factor of the first facsimile control unit 1 which has been inputted into the facsimile control unit 1 in order to raise the first facsimile control unit 1 and the first line control unit 2 from the sleeping mode. In this manner, the reception data of the second facsimile control unit 7 is transferred to the first facsimile control unit 1, which is decoded by the first facsimile control unit 1 to be output by the printer as images.

Also, the second facsimile control unit 7 and the second line control unit 8 suspend the clock oscillation by the clock control units of their own after the completion of the transfer of the reception data from the second facsimile control unit 7 to the first facsimile control unit 1, hence shifting to the sleeping mode immediately.

Fourth Embodiment

Figure 9:
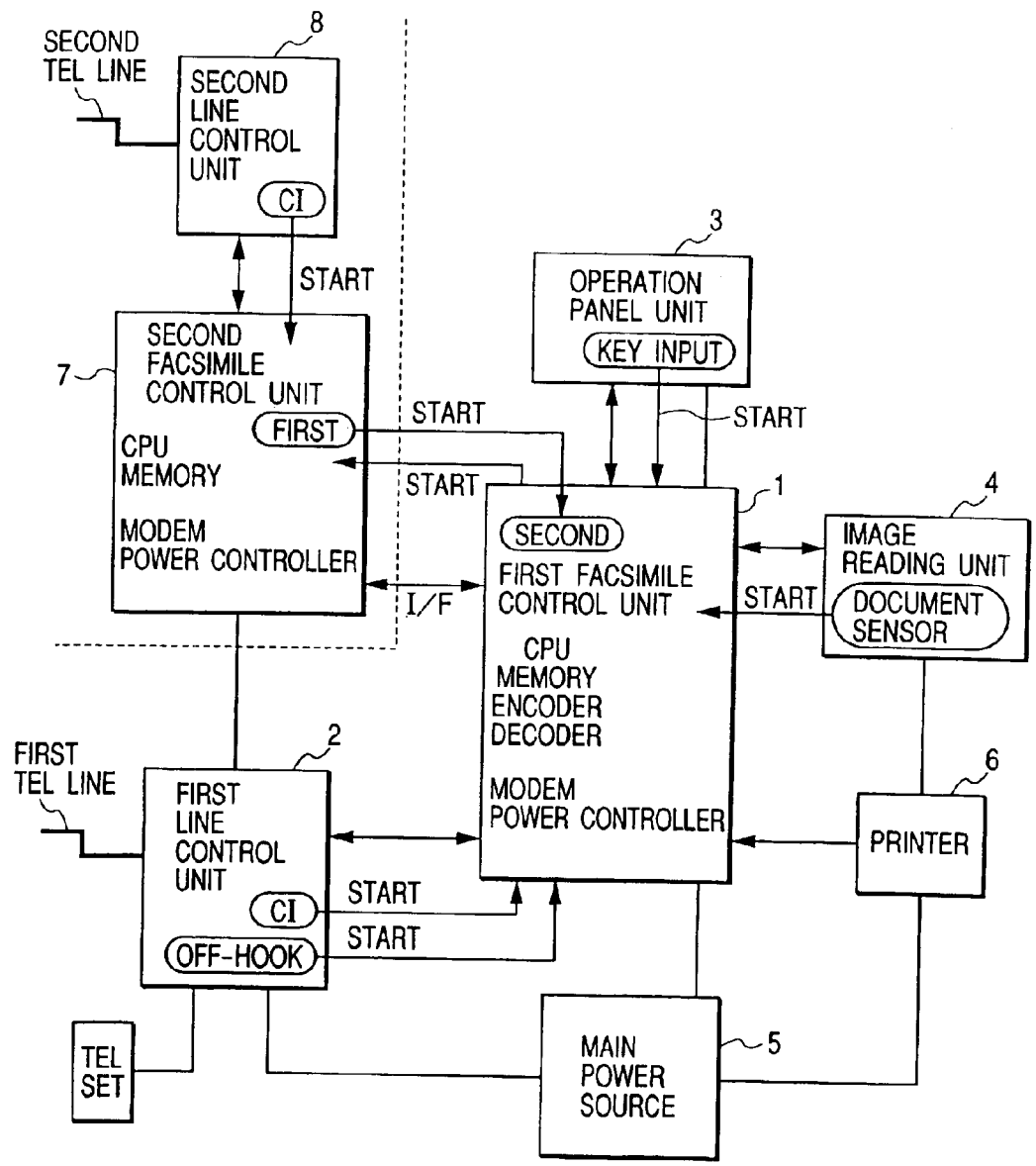
FIG. 9 is a block diagram which shows a low power dissipation facsimile apparatus capable of accommondating two lines in accordance with a fourth embodiment of the present invention.

FIG. 9 is a block diagram which shows the facsimile apparatus in accordance with a fourth embodiment of the present invention. Here, the description will be made of the structures by applying the same reference marks to the same structures as those appearing in FIG. 8.

In accordance with the present embodiment, a power source control units are provided for the first facsimile control unit 1 and the second facsimile control unit 7, respectively. Then, it is made possible to control the power supply for each of the facsimile control units 1 and 7 itself. Then, with this control, the shift to the sleeping mode (the low dissipation state) operates.

When the actuation factor is inputted to the power source control unit, the first facsimile system rises from the low power dissipation mode. Here, the power is of course supplied to the circuit that monitors each of the actuation factors, and also, to the power source control units even when the system is in the low power dissipation mode.

Of the communication sequences between the first facsimile control unit 1 and the second facsimile control unit 7 of the present embodiment, the description will be made only of the portion that differs from the one described in conjunction with the third embodiment. Here, FIGS. 8A to 8C are used for illustration.

When the facsimile apparatus of the present embodiment enters the low power dissipation state, the first facsimile control unit 1 and the second facsimile control unit 7 suspend the power supply to the monitoring circuit of each of the facsimile control units 1 and 7 in the low power dissipation mode, and also, suspend the power supply to the other parts than the power source control units, by means of each of the power source control units. Then, the system shifts to the sleeping mode.

In this case, there is in operation each of the detection circuits for actuation factors, that is, the key input of the first facsimile control unit 1, the document sheet sensor, the CI signal from the first line control unit 2, the off-hook of the telephone set and the actuation signal from the second facsimile control unit 7. Also, these are likewise in operational condition the call signal detection circuit of the line control unit 8 of the second facsimile control unit 7, and each of the detection circuits for the actuation signals from the first facsimile control unit.

Then, when the system rises from the low power dissipation state due to each of the factors, such as the key input, the document sheet sensor, the call signal form the first line, and the off-hook of the telephone set, the first facsimile control unit 1 detects it to perform the rising operation.

In this case, unless the operator designates the second line, the power is not supplied to the second facsimile control unit 7 and the second line control unit 8. Therefore, the second facsimile system is still in the sleeping mode.

Now, if the operator should designate the second line for the transmission operation, or if he/she wishes to operate such transmission during the communication through the first line, the actuation signal is sent out from the first facsimile control unit 1 to the second facsimile control unit 7 as shown in FIG. 8C. In this manner, the second facsimile control unit 7 rises from the sleeping mode.

Also, when the system should rise from the low power dissipation state due to the call signal from the second line, the second line control unit 8 detects the call signal from the line as shown in FIG. 8B. Then, the second facsimile control unit 7 detects it to perform the rising operation itself, hence performing the usual reception operation.

In this case, unless the operator designates the first line for the transmission operation or unless any call signal arrives in the first line, the power is not supplied to the first facsimile control unit 1 and the first line control unit 2. As a result, the first facsimile system is still in the sleeping mode.

The received image data are stored on the memory of the second facsimile control unit 7 as the coded data.

Then, after the completion of the reception, the second facsimile control unit 7 activates the actuation factors of the first facsimile control unit 1 which have been inputted into the first facsimile control unit 1, and enables the first facsimile control unit 1 and the first line control unit 2 to rise from the sleeping mode. Thus, the data received from the second facsimile control unit 7 is transferred to the first facsimile control unit 1 where the data is decoded by the first facsimile control unit 1 for the print out as images.

What is claimed is:

1. A facsimile apparatus adapted to accommodate a plurality of telephone lines connectable with respective different remote partners at a same time, comprising:

a first facsimile communication unit connectable with a first telephone line, adapted to reduce power dissipation on standby, and adapted to communicate with a remote partner via the first telephone line;

a second facsimile communication unit connectable with a second telephone line, adapted to reduce power dissipation on standby, and adapted to communicate with a remote partner via the second telephone line;

a power supply unit adapted to supply power to said first and second facsimile communication units;

a detection unit adapted to detect actuation factors for said first and second facsimile communication units; and a controller adapted to, when said first and second facsimile communication units are on standby, control said power supply unit to supply power to said second facsimile communication unit but not to supply power to said first facsimile communication unit, in order to retain said first facsimile communication unit as it is on standby, in response to detection of an actuation factor for said second facsimile communication unit by said detection unit, wherein each of said first and second facsimile communication units can execute communication for image data, independently, and while one of these facsimile communication units is executing the communication, the other facsimile communication unit can be retained on standby, thereby reducing power dissipation, further comprising a document sheet reading unit, wherein said detection unit detects an actuation factor in response to detection of a document sheet in said document sheet reading unit.

2. A facsimile apparatus adapted to accommodate a plurality of telephone lines connectable with respective different remote partners at a same time, comprising:

a first facsimile communication unit connectable with a first telephone line, adapted to reduce power dissipation on standby, and adapted to communicate with a remote partner via the first telephone line;

a second facsimile communication unit connectable with a second telephone line, adapted to reduce power dissipation on standby, and adapted to communicate with a remote partner via the second telephone line;

a storage unit adapted to store image data received by said second facsimile communication unit;

a detection unit adapted to detect actuation factors for said first and second facsimile communication units;

a power supply unit adapted to supply power to said first and second facsimile communication units; and a printer unit adapted to print out image data received by said first and second facsimile communication units;

wherein, when said first and second facsimile communication units are in a standby state of not receiving power from said power supply unit, in response to detection of an actuation factor for said first facsimile communication unit by said detection unit, said first facsimile communication unit shifts from the standby state to an operational state of receiving power from said power supply unit in order to receive image data, while said second facsimile communication unit is retained on standby, and said first facsimile communication unit outputs the received image data to said printer unit; and in response to detection of an actuation factor for said second facsimile communication unit by said detection unit, said second facsimile communication unit shifts from the standby state to an operational state of receiving power from said power supply unit in order to receive image data, stores the received image data in said storage unit, and enables said first facsimile communication unit to shift from the standby state to the operational state, and said first facsimile communication unit outputs the image data stored in said storage unit to said printer unit.

3. A facsimile apparatus according to claim 2, wherein said second facsimile communication unit sends an actuation signal to said detection unit after completion of image data reception.

4. A facsimile apparatus according to claim 2, wherein said first facsimile communication unit is provided with a memory for storing image data received from said storage unit, said second facsimile communication unit transfers the image data stored in said storage unit to the memory of said first facsimile communication unit, and said first facsimile communication unit outputs the image data transferred to the memory to said printer unit.

5. A facsimile apparatus according to claim 2, further comprising a second detection unit adapted to detect an actuation factor for said second facsimile communication unit, wherein said second facsimile communication unit is adapted to reduce power dissipation on standby and shift from the standby state to the operational state in response to detection of the actuation factor by said second detection unit.

6. A facsimile apparatus adapted to accommodate a plurality of telephone lines connectable with respective different remote partners at a same time, comprising:

a first facsimile communication unit connectable with a first telephone line, adapted to reduce power dissipation on standby, and adapted to communicate with a remote partner via the first telephone line;

a second facsimile communication unit connectable with a second telephone line, adapted to reduce power dissipation on standby, and adapted to communicate with a remote partner via the second telephone line;

a reading unit adapted to read image data;

an instruction unit adapted to instruct transmission of the image data read by said reading unit;

a power supply unit adapted to supply power to said first and second facsimile communication units; and a controller adapted to, when said first and second facsimile communication units are on standby, in response to an instruction from said instruction unit during a communication by said first facsimile communication unit, shift said second facsimile communication unit from a standby state of not receiving power from said power supply unit to an operational state of receiving power from said power supply unit in order to transmit image data, and, in response to an instruction from said instruction unit, shift said first facsimile communication unit from a standby state to an operational state in order to transmit image data from said first facsimile communication unit, while retaining said second communication as it is on standby without shifting said second facsimile communication unit to an operational state, wherein said reading unit is a scanner for reading a document sheet.

7. A facsimile apparatus adapted to accommodate a plurality of telephone lines connectable with respective different remote partners at a same time, comprising:

a first facsimile communication unit connectable with a first telephone line, adapted to reduce power dissipation on standby, and adapted to communicate with a remote partner via the first telephone line;

a second facsimile communication unit connectable with a second telephone line, adapted to reduce power dissipation on standby, and adapted to communicate with a remote partner via the second telephone line;

a detection unit adapted to detect actuation factors for said first and second facsimile communication units;

a power supply unit adapted to supply power to said first and second facsimile communication units; and a printer unit adapted to print out image data received by said first and second facsimile communication units, wherein, when said first and second facsimile communication units are in a standby state of not receiving power from said power supply unit, in response to detection of an actuation factor for said first facsimile communication unit by said detection unit, said first facsimile communication unit shifts from the standby state to an operational state of receiving power from said power supply unit in order to receive image data, while retaining said second facsimile communication unit as it is on standby without shifting said second facsimile communication unit from the standby state to an operational state, and said first facsimile communication unit outputs the received image data to said printer unit, and, in response to detection of an actuation factor for said second facsimile communication unit, said second facsimile communication unit shifts from the standby state to an operational state of receiving power from said power supply unit in order to receive image data and enables said first facsimile communication unit to shift from the standby state to the operational state, and said first facsimile communication unit outputs the received image data to said printer unit.

8. A facsimile apparatus adapted to accommodate a plurality of telephone lines connectable with respective different remote partners at a same time, comprising:

a first facsimile communication unit connectable with a first telephone line, adapted to reduce power dissipation on standby, and adapted to communicate with a remote partner via the first line;

a second facsimile communication unit connectable with a second telephone line, adapted to reduce power dissipation on standby, and adapted to communicate with a remote partner via the second telephone line;

a first controller for controlling said first facsimile communication unit, said first controller adapted to reduce power dissipation on standby;

a second controller for controlling said second facsimile communication unit, said second controller adapted to reduce power dissipation on standby; and a power supply unit adapted to supply power to said first and second facsimile communication units and said first and second controllers, wherein said first controller includes a detection unit adapted to detect actuation factors for said first and second facsimile communication units, and, when said first and second facsimile communication units and said first and second controllers are in a standby state, said second facsimile communication unit and said second controller shift from the standby state of not receiving power from said power supply unit to an operational state in response to detection of an actuation factor for said second facsimile communication unit by the detection unit, retaining said first facsimile communication unit and said first controller as they are on standby, further comprising a storage unit adapted to store received image data and a printer unit adapted to output the received image data, wherein after said second facsimile communication unit and said second controller shift from the standby state to the operational state and image data received in said second facsimile communication unit is stored in said storage unit, said second controller outputs an actuation factor to said first controller in order to output the received image data to said printer unit, and said first controller shifts from the standby state to an operational state.

9. A facsimile apparatus adapted to accommodate a plurality of telephone lines connectable with respective different remote partners at a same time, comprising:

a first facsimile communication unit connectable with a first telephone line, adapted to reduce power dissipation on standby, and adapted to communicate with a remote partner via the first line;

a second facsimile communication unit connectable with a second telephone line, adapted to reduce power dissipation on standby, and adapted to communicate with a remote partner via the second telephone line;

a first controller for controlling said first facsimile communication unit, said first controller adapted to reduce power dissipation on standby;

a second controller for controlling said second facsimile communication unit, said second controller adapted to reduce power dissipation on standby; and a power supply unit adapted to supply power to said first and second facsimile communication units and said first and second controllers, wherein said first controller includes a detection unit adapted to detect actuation factors for said first and second facsimile communication units, and, when said first and second facsimile communication units and said first and second controllers are in a standby state, said second facsimile communication unit and said second controller shift from the standby state of not receiving power from said power supply unit to an operational state in response to detection of an actuation factor for said second facsimile communication unit by the detection unit, retaining said first facsimile communication unit and said first controller as they are on standby, further comprising a printer unit adapted to output received image data, wherein after said second facsimile communication unit and said second controller shift from the standby state to the operational state, said second controller outputs an actuation factor to said first controller in order to output the received image data to said printer unit, and said first controller shifts from the standby state to an operational state.

10. A communication method adapted to accommodate a plurality of telephone lines connectable with respective different remote partners at a same time, comprising the steps of:

connecting a first facsimile communication unit with a first telephone line, the first facsimile communication unit being adapted to reduce power dissipation on standby, and being adapted to communicate with a remote partner via the first telephone line;

connecting a second facsimile communication unit with a second telephone line, the second facsimile communication unit being adapted to reduce power dissipation on standby, and being adapted to communicate with a remote partner via the second telephone line;

providing a power supply unit adapted to supply power to the first and second communication units;

detecting actuation factors for the first and second facsimile communication units; and, when the first and second facsimile communication units are on standby, controlling the power supply unit to supply power to the second facsimile communication unit but not to supply power to the first facsimile communication unit, in order to retain the first facsimile communication unit as it is on standby, in response to detection of an actuation factor for the second facsimile communication unit in said detecting step, further comprising the step of detecting, by using a document sheet reading unit, an actuation factor in response to detection of a document sheet in the document sheet reading unit.

11. A communication method adapted to accommodate a plurality of telephone lines connectable with respective different remote partners at a same time, comprising the steps of:

connecting a first facsimile communication unit with a first telephone line, the first facsimile communication unit being adapted to reduce power dissipation on standby, and being adapted to communicate with a remote partner via the first telephone line;

connecting a second facsimile communication unit with a second telephone line, the second facsimile communication unit being adapted to reduce power dissipation on standby, and being adapted to communicate with a remote partner via the second telephone line;

storing image data received by the second facsimile communication unit;

detecting actuation factors for the first and second facsimile communication units;

providing a power supply unit adapted to supply power to the first and second facsimile communication units; and printing image data received by the first and second facsimile communication units, wherein, when the first and second facsimile communication units are in a standby state of not receiving power from the power supply unit, in response to detection of an actuation factor for the first facsimile communication unit in said detecting step, the first facsimile communication unit shifts from the standby state to an operational state of receiving power from the power supply unit in order to receive image data, while the second facsimile communication unit is retained on standby, and the first facsimile communication unit provides the received image data to be printed in said printing step, and in response to detection of an actuation factor for said second facsimile communication unit in said detecting step, the second facsimile communication unit shifts from the standby state to an operational state of receiving power from the power supply unit in order to receive image data, stores the received image data in a storage unit, and enables the first facsimile communication unit to shift from the standby state to the operational state, and the first facsimile communication unit provides the image data stored in the storage unit to be printed in said printing step.

12. The communication method according to claim 11, wherein the second facsimile communication unit sends an actuation signal to a detection unit after completion of image data reception.

13. The communication method according to claim 11, wherein the first facsimile communication unit is provided with a memory for storing image data received from the storage unit, the second facsimile communication unit transfers the image data in the storage unit to the memory of the first facsimile communication unit, and the first facsimile communication unit outputs the image data transferred to the memory to an output unit.

14. The communication method according to claim 11, further comprising a second detecting step, of detecting an actuation factor for the second facsimile communication unit, wherein the second facsimile communication unit is adapted to reduce power dissipation on standby and to shift from the standby state to an operational state in response to detection of the actuation factor in said second detecting step.

15. A communication method adapted to accommodate a plurality of telephone lines connectable with respective different remote partners at a same time, comprising the steps of:

connecting a first facsimile communication unit with a first telephone line, the first facsimile communication unit being adapted to reduce power dissipation on standby, and being adapted to communicate with a remote partner via the first telephone line;

connecting a second facsimile communication unit with a second telephone line, the second facsimile communication unit being adapted to reduce power dissipation on standby, and being adapted to communicate with a remote partner via the second telephone line;

inputting image data;

instructing transmission of the inputted image data;

providing a power supply unit adapted to supply power to the first and second facsimile communication units; and controlling, when the first and second facsimile communication units are on standby, in response to an instruction in said instructing step during a communication by the first facsimile communication unit, to shift the second facsimile communication unit from a standby state of not receiving power from the power supply unit to an operational state of receiving power from the power supply unit in order to transmit image data, and, in response to an instruction in said instructing step, to shift the first facsimile communication unit from a standby state to an operational state in order to transmit image data from the first facsimile communication unit, while retaining the second communication as it is on standby without shifting the second facsimile communication unit to an operational state, wherein the image data is inputted by a scanner.

16. A communication method adapted to accommodate a plurality of telephone lines connectable with respective different remote partners at a same time, comprising the steps of:

connecting a first facsimile communication unit with a first telephone line, the first facsimile communication unit being adapted to reduce power dissipation on standby, and being adapted to communicate with a remote partner via the first telephone line;

connecting a second facsimile communication unit with a second telephone line, the second facsimile communication unit being adapted to reduce power dissipation on standby, and being adapted to communicate with a remote partner via the second telephone line;

detecting actuation factors for the first and second facsimile communication units;

providing a power supply unit adapted to supply power to the first and second facsimile communication units; and printing image data received by the first and second facsimile communication units, wherein, when the first and second facsimile communication units are in a standby state of not receiving power from the power supply unit, in response to detection of an actuation factor for the first facsimile communication unit in said detecting step, the first facsimile communication unit shifts from the standby state to an operational state of receiving power from the power supply unit in order to receive image data, while retaining the second facsimile communication unit as it is on standby without shifting the second facsimile communication unit from the standby state to an operational state, and the first facsimile communication unit provides the received image data to be printed in said printing step, and, in response to detection of an actuation factor for the second facsimile communication unit, the second facsimile communication unit shifts from the standby state to an operational state of receiving power from the power supply unit in order to receive image data and enables the first facsimile communication unit to shift from the standby state to the operational state, and the first facsimile communication unit provides the received image data for printing in said printing step.

17. A communication method adapted to accommodate a plurality of telephone lines connectable with respective different remote partners at a same time, comprising the steps of:

connecting a first facsimile communication unit with a first telephone line, the first facsimile communication unit being adapted to reduce power dissipation on standby, and being adapted to communicate with a remote partner via the first telephone line;

connecting a second facsimile communication unit with a second telephone line, the second facsimile communication unit being adapted to reduce power dissipation on standby, and being adapted to communicate with a remote partner via the second telephone line;

controlling by a first controller the first facsimile communication unit, the first controller being adapted to reduce power dissipation on standby;

controlling by a second controller the second facsimile communication unit, the second controller being adapted to reduce power dissipation on standby; and providing a power supply unit adapted to supply power to the first and second facsimile communication units and the first and second controllers, wherein the first controller includes a detection unit adapted to detect actuation factors for the first and second facsimile communication units, and, when the first and second facsimile communication units and the first and second controllers are in a standby state, the second facsimile communication unit and the second controller shift from the standby state of not receiving power from the power supply unit to an operational state in response to detection of an actuation factor for the second facsimile communication unit by the detection unit, retaining the first facsimile communication unit and the first controller as they are on standby, further comprising the steps of storing in a storage unit received image data and outputting using an output unit the received image data, wherein after the second facsimile communication unit and the second controller shift from the standby state to the operational state and image data received in the second facsimile communication unit is stored in the storage unit, the second controller outputs an actuation factor to the first controller in order to output the received image data to the output unit, and the first controller shifts from the standby state to an operational state.

18. A communication method adapted to accommodate a plurality of telephone lines connectable with respective different remote partners at a same time, comprising the steps of:

connecting a first facsimile communication unit with a first telephone line, the first facsimile communication unit being adapted to reduce power dissipation on standby, and being adapted to communicate with a remote partner via the first telephone line;

connecting a second facsimile communication unit with a second telephone line, the second facsimile communication unit being adapted to reduce power dissipation on standby, and being adapted to communicate with a remote partner via the second telephone line;

controlling by a first controller the first facsimile communication unit, the first controller being adapted to reduce power dissipation on standby;

controlling by a second controller the second facsimile communication unit, the second controller being adapted to reduce power dissipation on standby; and providing a power supply unit adapted to supply power to the first and second facsimile communication units and the first and second controllers, wherein the first controller includes a detection unit adapted to detect actuation factors for the first and second facsimile communication units, and, when the first and second facsimile communication units and the first and second controllers are in a standby state, the second facsimile communication unit and the second controller shift from the standby state of not receiving power from the power supply unit to an operational state in response to detection of an actuation factor for the second facsimile communication unit by the detection unit, retaining the first facsimile communication unit and the first controller as they are on standby, further comprising the step of outputting received image data, wherein after the second facsimile communication unit and the second controller shift from the standby state to the operational state, the second controller outputs an actuation factor to the first controller in order to output the received image data to an output unit, and the first controller shifts from the standby state to an operational state.

* * * * *

UNITED STATES PATENT AND TRADEMARK OFFICE
CERTIFICATE OF CORRECTION

PATENT NO. : 6,903,835 B1  Page 1 of 1
DATED : June 7, 2005
INVENTOR(S) : Yuichi Naoi It is certified that error appears in the above-identified patent and that said Letters Patent is hereby corrected as shown below:

Title page,
Item [57], ABSTRACT,
Line 7, "wherein" should read -- which --.

Drawings,
Sheet 8, FIG. 8B, "(IMMEADIATELY" should read -- IMMEDIATELY --.

Column 1,
Line 48, "comprise" should read -- comprises --; and
Line 51, "form" should read -- from --.

Column 2,
Line 36, "before-mentiones," should read -- before-mentioned, --; and "apparatuse" should read -- apparatus --.

Column 10,
Line 22, "a" should be deleted.

Signed and Sealed this

Eleventh Day of October, 2005

JON W. DUDAS
*Director of the United States Patent and Trademark Office*